US009470368B2

(12) United States Patent
Ganzer et al.

(10) Patent No.: US 9,470,368 B2
(45) Date of Patent: Oct. 18, 2016

(54) ADHESIVE BUFFER UNIT AND ASSOCIATED FILL SYSTEMS AND METHODS FOR STORING AND MOVING ADHESIVE PARTICULATE

(71) Applicant: Nordson Corporation, Westlake, OH (US)

(72) Inventors: Charles P. Ganzer, Cumming, GA (US); Enes Ramosevac, Snellville, GA (US)

(73) Assignee: Nordson Corporation, Westlake, OH (US)

( * ) Notice: Subject to any disclaimer, the term of this patent is extended or adjusted under 35 U.S.C. 154(b) by 15 days.

(21) Appl. No.: 14/491,019

(22) Filed: Sep. 19, 2014

(65) Prior Publication Data

US 2015/0083230 A1 Mar. 26, 2015

Related U.S. Application Data

(60) Provisional application No. 61/880,534, filed on Sep. 20, 2013.

(51) Int. Cl.
*B65G 53/40* (2006.01)
*F17D 1/08* (2006.01)
(Continued)

(52) U.S. Cl.
CPC ........... *F17D 1/088* (2013.01); *B05C 11/1002* (2013.01); *B05C 11/1042* (2013.01); *B05C 11/1047* (2013.01); *F17D 1/20* (2013.01); *Y10T 137/0391* (2015.04); *Y10T 137/85978* (2015.04)

(58) Field of Classification Search
CPC .................... B65G 53/00–53/66; B65G 88/66
USPC ........................................... 406/134; 222/630
See application file for complete search history.

(56) References Cited

U.S. PATENT DOCUMENTS 2,568,332 A 9/1951 Genovese
2,668,388 A * 2/1954 Thompson .......... A01M 9/0092 406/135

(Continued)

FOREIGN PATENT DOCUMENTS

DE 2461696 A1 7/1976
DE 2720694 A1 11/1978

(Continued)

OTHER PUBLICATIONS

European Patent Office, International Search Report and Written Opinion in PCT Application Serial No. PCT/US2014/056376, Mar. 19, 2015 (19 pages).

(Continued)

*Primary Examiner* — William R Harp
(74) *Attorney, Agent, or Firm* — Baker & Hostetler LLP

(57) ABSTRACT

A buffer unit is configured to store and transfer adhesive particulate to at least one adhesive melter. The buffer unit includes a buffer bin defining an interior space configured to hold a bulk supply of adhesive particulate with an agitator plate positioned within the housing at a non-horizontal orientation. A vibration generating mechanism is coupled to the agitator plate so that vibration is transmitted into the adhesive particulate to form a flow of fluidized adhesive particulate which flows toward at least one pump inlet. The buffer unit breaks up clumps of coalesced adhesive particulate to avoid clogging the pump inlet, while also ensuring that all adhesive particulate in the buffer bin can be removed at the pump inlet. Additionally, makeup air used by pumps to generate vacuum at the pump inlet does not need to be drawn through the entire bulk supply of adhesive particulate.

35 Claims, 5 Drawing Sheets

(51) Int. Cl.
*F17D 1/20* (2006.01)
*B05C 11/10* (2006.01)

(56) References Cited

U.S. PATENT DOCUMENTS

| | | | | | |
|---|---|---|---|---|---|
| 2,907,498 | A | * | 10/1959 | Van Der Lely | A01C 15/00 222/199 |
| 3,348,936 | A | | 10/1967 | Clark | |
| 3,715,059 | A | * | 2/1973 | Hyer | B65D 88/66 222/199 |
| 3,747,810 | A | * | 7/1973 | Graser | B65D 88/66 222/199 |
| 3,933,394 | A | * | 1/1976 | Klein | B65G 53/22 406/138 |
| 4,353,668 | A | * | 10/1982 | Anderson | B65G 53/22 406/138 |
| 4,522,500 | A | * | 6/1985 | Hyer | B01F 11/0266 222/198 |
| 4,532,961 | A | | 8/1985 | Walton et al. | |
| 4,615,649 | A | | 10/1986 | Sharpless | |
| 4,790,455 | A | | 12/1988 | Dieringer et al. | |
| 5,378,089 | A | | 1/1995 | Law | |
| 5,381,967 | A | * | 1/1995 | King | B65G 65/44 222/161 |
| 5,713,494 | A | * | 2/1998 | Kaiju | B65D 83/00 406/109 |
| 5,915,312 | A | * | 6/1999 | Meyer | A01C 7/044 111/174 |
| 6,196,417 | B1 | | 3/2001 | Johnson et al. | |
| 8,985,391 | B2 | * | 3/2015 | Ross | B29B 13/022 222/1 |
| 2003/0121274 | A1 | | 7/2003 | Wightman | |
| 2005/0098579 | A1 | | 5/2005 | Dittmann et al. | |
| 2014/0102858 | A1 | | 4/2014 | Chau et al. | |

FOREIGN PATENT DOCUMENTS

| | | | |
|---|---|---|---|
| DE | 8704215 | U1 | 5/1987 |
| EP | 2502721 | A2 | 9/2012 |
| JP | 2000198539 | A | 7/2000 |

OTHER PUBLICATIONS

European Patent Office, International Search Report and Written Opinion in PCT Application No. PCT/US2014/056534, Feb. 4, 2015.

U.S. Patent and Trademark Office, International Search Report and Written Opinion in PCT Application Serial No. PCT/US2014/031648, Aug. 20, 2014 (11 pages).

European Patent Office, Invitation to Pay Additional Fees in PCT Application Serial No. PCT/US2014/056376, Dec. 18, 2014 (6 pages).

* cited by examiner

ADHESIVE BUFFER UNIT AND ASSOCIATED FILL SYSTEMS AND METHODS FOR STORING AND MOVING ADHESIVE PARTICULATE

CROSS REFERENCE TO RELATED APPLICATION

This application claims the priority of U.S. Provisional Patent Application Ser. No. 61/880,534, filed on Sep. 20, 2013, the entire disclosure of which is hereby incorporated by reference herein.

TECHNICAL FIELD

The present invention relates generally to hot melt adhesive systems, and more particularly, to systems for temporarily storing and transferring unmelted hot melt adhesive particulate, such as from bulk storage to melters and dispenser units.

BACKGROUND

Hot melt adhesive systems have many applications in manufacturing and packaging. For example, thermoplastic hot melt adhesives are used for carton sealing, case sealing, tray forming, pallet stabilization, nonwoven applications including diaper manufacturing, and many other applications. Hot melt adhesives often come in the form of various solids or pieces (hereinafter referred to as "particulate(s)"). These hot melt adhesive particulates are melted into a liquid form by a melter, and the liquid hot melt adhesive is ultimately applied to an object such as a work piece, substrate or product by a dispensing device suitable to the application.

A supply of unmelted hot melt adhesive particulate must be maintained and delivered to the melter in order for the melter to produce the liquid hot melt adhesive used by the dispensing device. For example, it is known for a person to employ a scoop or bucket to retrieve hot melt adhesive particulate from a bulk supply, and to deliver those particulate to the melter. Typically, this involves filling a hopper or other container associated with the melter one scoop of hot melt adhesive particulate at a time. This requires the person to handle the hot melt adhesive particulate closely, which may be undesirable because hot melt adhesive dust may be stirred up during handling. In addition, transferring hot melt adhesive particulate in this manner is prone to waste caused by spillage.

To address these concerns with hand filling, the solid particulate adhesive material may be provided on demand by automated filling, depending on the specific design of the melter. Moreover, some melters are designed in such a manner that hand filling is not possible. In some of these systems, the adhesive pellets are designed to be transferred by pressurized air from a pneumatic pump of a fill system into the melter, whenever the melter requires additional material to heat and dispense. In this regard, the fill system ensures that the amount of adhesive material within the melter remains at sufficient levels during operation of the dispensing system. The fill system must be supplied reliably with additional adhesive particulate in order to meet the demands of the melter during operation.

One particular type of fill system is defined by a tote-based pneumatic fill system. The tote-based pneumatic fill system includes a trash can-like wheeled supply container (which may also be referred to as a tote) with an interior space having a size sufficient to hold enough adhesive material for multiple hours of operation of the dispensing system. An adhesive bin defined by the tote may contain adhesive particulate for storage prior to melting in the adhesive melter. A transfer pump, such as a pneumatic pump, connects to the adhesive bin for moving the adhesive particulate via a hose from the adhesive bin to the adhesive melter. Pneumatic pumps generally rely on the suction of gas, such as air, entrained within gaps between individual pieces of adhesive particulate stored within the adhesive bin for moving the adhesive particulate. This gas may also be referred to as "make-up" gas.

Traditionally, the adhesive particulate gravity feeds into a lower portion of the adhesive bin toward an inlet of the transfer pump and submerges a majority of the pump inlet. The transfer pump generates a vacuum at the inlet that withdraws the entrained make-up gas and adhesive particulate therein. In turn, the suction of the entrained make-up gas creates a vacuum within the gaps of the adhesive particulate that withdraws additional gas from a surrounding environment. This additional gas must be drawn through the entire height of adhesive particulate stacked on top of the transfer pump inlet, which can be difficult. Thus, the transfer pumps in conventional tote-based fill systems may become starved for air to produce the vacuum required in order to continue moving adhesive particulate out of the adhesive bin.

Conventional tote-based systems also typically include a vibration generating mechanism that agitates the adhesive in an effort to encourage flow of adhesive particulate towards the pump inlets while also assisting with drawing the addition gas or "make-up" gas through the stacked adhesive particulate. This vibration generating mechanism is mounted on a near-vertical surface along a side of the tote including the pump inlet in conventional systems. Although this positioning of the vibration generating mechanism provides sufficient vibration of the adhesive particulate located in close proximity to the back side of the tote, the vibration energy dissipates and becomes less effective as it moves through the mass of adhesive particulate. Consequently, the effectiveness of vibration to break apart or loosen adhesive that is stuck together (such as by being coalesced) in clumps far away from the vibrating surface is reduced. These clumps of adhesive particulate may pass through this zone of insufficient vibration and may then lead to blockages at the pump inlet.

Furthermore, the pump inlet of conventional tote-based systems is generally positioned above the lowest point in the adhesive bin. As a result of this arrangement, the adhesive particulate below the pump inlet is effectively trapped and the pneumatic pump is incapable of removing it from the adhesive bin. Over time, this adhesive particulate will solidify into a solid mass that could break off into clumps that may lead to blockages at the pump inlet. Because of the difficulty in drawing "make-up" air to the pump inlet as described above, it has been impossible to move the pump inlet downwardly further without exacerbating the problems with the pneumatic pump becoming starved for air flow. In addition, the storage capacity of the adhesive bin cannot reasonably be reduced without requiring refills too frequently for convenience of end users. Thus, the conventional tote-based systems continue to struggle with problems caused by clumping of adhesive particulate and air flow to the pump inlets.

There is a need, therefore, for improvements in hot melt adhesive systems, and specifically, a need for an adhesive storage unit and method for use with a transfer pump that addresses present challenges and characteristics such as those discussed above, particularly tailored for use in transferring adhesive particulate from bulk supply to melter(s).

SUMMARY

According to one embodiment, a buffer unit is configured to store and transfer adhesive particulate to at least one adhesive melter. The buffer unit includes a buffer bin defined by a housing including a bottom wall and a sidewall extending from the bottom wall to form an interior space. An agitator plate is positioned within the buffer bin and is supported within the buffer bin so as to be angled from a horizontal orientation. More specifically, the agitator plate has an upper end operatively coupled to the sidewall and a bottom end operatively coupled to the bottom wall. Accordingly, the floating plate divides the interior space into a lower chamber portion and an upper chamber portion which is configured to receive a bulk supply of adhesive particulate. The buffer bin also includes a vibration generating mechanism that is coupled to the agitator plate and is configured to selectively vibrate the agitator plate to produce a relative motion between the agitator plate and the bulk supply of adhesive particulate. This relative motion is configured to generate a flow of fluidized adhesive particulate which moves towards the bottom end of the agitator plate. At least one pump inlet is located proximate to the bottom end of the agitator plate so that each pump inlet is configured to receive the flow of fluidized adhesive particulate moving towards the bottom end. The buffer unit is configured to hold a multiple hour supply of adhesive particulate and reliably deliver it to one or more melters using pneumatic transfer pumps.

In one aspect, the sidewall of the buffer bin includes a front side defining an outlet for the adhesive particulate (e.g., at the pump inlet(s)) and a rear side opposite the front side. Along the rear side, a support bracket is coupled to the sidewall at a position above the bottom wall of the buffer bin. This support bracket engages the upper end of the agitator plate, which enables the agitator plate to be disposed at the angle from the horizontal orientation within the buffer bin. The agitator plate includes a periphery and a resilient/rubber cushion extending around the periphery. The resilient cushion member dampens transmission of vibration from the agitator plate into the housing such that most of the vibration generated by the vibration generating mechanism is transmitted to the adhesive particulate. The resilient cushion also prevents leakage of the adhesive particulate into the lower chamber portion, which is where the vibration generating mechanism is located.

The buffer unit also includes a platform operatively coupled to the bottom wall of the buffer bin and a lift mechanism connecting the platform to the bottom wall. The lift mechanism moves the buffer bin upwardly relative to the platform to selectively engage a mobile bin configured to refill the upper chamber portion with the adhesive particulate. For example, the lift mechanism further includes at least one compression spring that biases the buffer bin to move upwardly away from the platform. An air cylinder is connected to the bottom wall of the buffer bin and the platform, and this air cylinder is actuated to move the buffer bin downwardly towards the platform against the bias of the compression spring(s). Consequently, the buffer bin is mounted so that the mobile bin can be rolled over the buffer unit and then the buffer unit can be actively engaged with the mobile bin during refilling of the buffer unit, the mobile bin and buffer unit defining parts of an adhesive fill system. It will be appreciated that some embodiments of the buffer unit include a level sensor that senses whether the adhesive particulate level within the upper chamber portion falls below a predetermined threshold level for requiring refill of the buffer unit. When the level sensor sends such a refill signal, an operator can retrieve and move a filled mobile bin to the position over the buffer unit to refill the buffer bin, as described above.

In some embodiments, the agitator plate also includes a plurality of pins projecting upwardly into the upper chamber portion and configured to assist with breaking apart clumps of coalesced adhesive particulate during vibration of the adhesive particulate. To this end, the pins transfer the vibrations in the agitator plate up into the bulk supply of adhesive particulate above the agitator plate. The plurality of pins may be provided in multiple aligned rows, with the pins in each row laterally offset from pins in adjacent rows so as to ensure that any clumps in the flow of adhesive particulate moving along the agitator plate are broken up before flowing to the pump inlet.

In another aspect, the buffer unit includes a flow control plate located within the upper chamber portion and dividing the upper chamber portion into a pump inlet chamber located adjacent the bottom end of the floating plate and a primary storage container configured to receive and store the bulk supply of adhesive particulate. The flow control plate is coupled to the sidewall and extends towards the agitator plate at a transverse angle to the angle of the agitator plate, the flow control plate defining a leading end adjustably spaced from the agitator plate to define a gap there between. This gap controls communication of adhesive particulate between the primary storage container and the pump inlet chamber. The flow control plate and the agitator plate collectively define a funnel shape for the primary storage container, the funnel shape feeding to the gap between these elements. The leading end of the flow control plate is provided on a moveable gate portion in one aspect, and this moveable gate portion can include a plurality of slots configured to at least partially receive one of the rows of pins when the pins are provided as described above.

The buffer unit in another aspect includes at least one pneumatic transfer pump coupled to the pump inlet(s). The pneumatic transfer pumps remove the adhesive particulate from the buffer unit and deliver it to the adhesive melter. In order to feed makeup air to these pumps, the buffer bin includes air vents located in the sidewall between the flow control plate and the at least one pneumatic transfer pump. The air vents are located to provide a short flow path for makeup air drawn by the vacuum produced at the pumps, this makeup air not being required to travel through the bulk supply of adhesive particulate in the upper chamber portion to reach the pumps. A divider plate may extend between the flow control plate and the sidewall proximate the air vents to divide the pump inlet chamber into an air channel communicating with the air vents and an adhesive outlet portion communicating with the gap and the pump inlet(s). This divider plate may carry a filter which covers a flow path through the divider plate. Consequently, the filter prevents adhesive particulate form entering and blocking the air channel, while also preventing contamination of adhesive with air drawn though the air channel and the air vents.

According to another embodiment in accordance with the invention, a method of transferring adhesive particulate to an adhesive melter with a buffer unit is provided. The method includes storing a bulk supply of adhesive particulate in an interior space of a buffer bin, the buffer bin including an agitator plate engaging a lower surface of the bulk supply. Vibrations are generated at the agitator plate with a vibration generating mechanism coupled to the agitator plate, which agitates the lower surface of the bulk supply and produces a flow of fluidized adhesive particulate. This flow of adhesive particulate moves downwardly along the agitator plate, which is mounted at a non-horizontal orientation within the buffer bin. The method further includes guiding the flow of adhesive particulate along the agitator plate to at least one pump inlet in the buffer unit. The adhesive particulate is then removed from the buffer bin through the pump inlet with at least one pneumatic transfer pump coupled with the pump inlet. As such, the adhesive particulate is delivered on demand to adhesive melters from the buffer bin.

According to yet another embodiment, a fill system is configured to store and transfer adhesive particulate to an adhesive melter. The fill system includes a storage container configured to contain a bulk supply of adhesive particulate, a separating element, and a drive. The separating element is positioned proximate to a bottom end of the storage container and is configured to engage a surface of the bulk supply. To this end, the separating element moves relative to the at least one surface to cause separation of adhesive particulate from the bulk supply and thereby produce a flow of fluidized adhesive particulate from the storage container. The drive is coupled to at least one of the storage container or the separating element. The drive creates the relative motion between the separating element and the at least one surface of the bulk supply.

These and other objects and advantages of the various embodiments of the invention will become more readily apparent during the following detailed description taken in conjunction with the drawings herein.

BRIEF DESCRIPTION OF THE DRAWINGS

The accompanying drawings, which are incorporated in and constitute a part of the specification, illustrate embodiments of the invention and, together with a general description of the invention given above, and the detailed description of the embodiments given below, serve to explain the principles of the invention.

DETAILED DESCRIPTION

Figure 1:
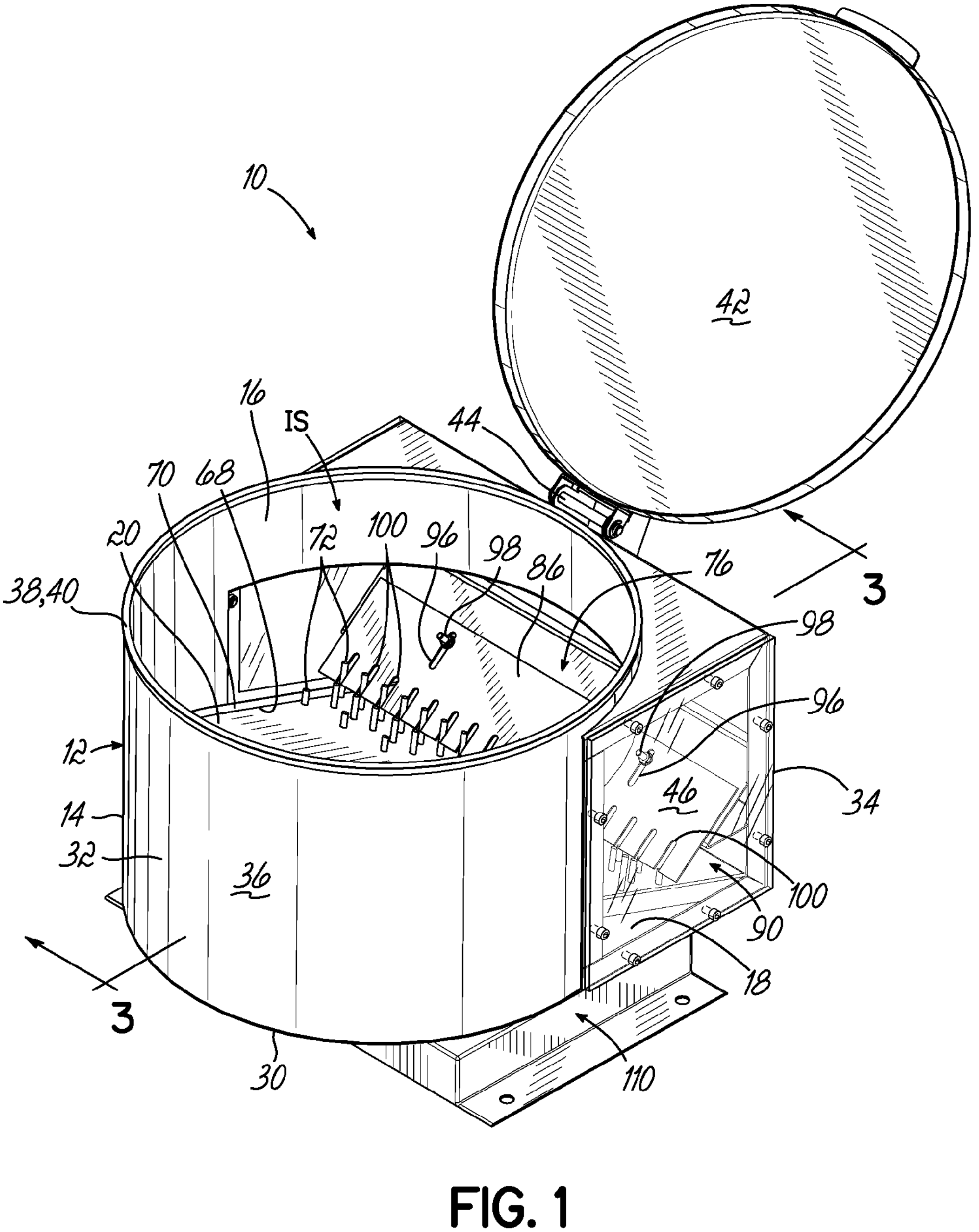
FIG. 1 is a front perspective view of a buffer unit in accordance with an exemplary embodiment of the invention, the buffer unit including a buffer bin with a lid of the buffer bin being opened to illustrate several internal elements.

With reference to FIGS. 1 through 4, an exemplary embodiment of a buffer unit 10 in accordance with the invention is shown in detail, the buffer unit 10 configured for use as part of a bulk adhesive fill system that feeds solid adhesive (in adhesive particulate form) to one or more adhesive melters. The buffer unit 10 addresses several of the shortcomings in conventional totes and storage devices used for moving adhesive particulate to melters and hot melt adhesive dispensing devices. To this end, the buffer unit 10 includes a buffer bin 12 defined by a housing 14 that forms an interior space "IS" divided into an upper chamber portion 16 and a lower chamber portion 18 by an agitator plate 20 positioned within the housing 14. The agitator plate 20 is sometimes referred to as a "floating plate" or a "sloped internal plate" in the context of this disclosure and how the agitator plate 20 is mounted. The agitator plate 20 is angled from a horizontal orientation and thereby defines a sloped surface for the adhesive particulate to slide downwardly towards at least one pump inlet 22 provided in the housing 14. Advantageously, the buffer unit 10 includes a plurality of pump inlets 22 and is designed to feed multiple pneumatic transfer pumps 24 and associated adhesive melters for multiple hours when fully loaded with adhesive particulate.

A vibration generating mechanism 26 is coupled to this agitator plate 20 so that vibration is transmitted into the adhesive particulate via a bottom surface of the bulk supply of adhesive particulate held within the buffer unit 10. This application of vibration produces a flow of fluidized adhesive particulate that more reliably moves downwardly along the angled agitator plate 20 to the pump inlets 22. As a result, the entire bulk supply of adhesive particulate can be delivered to the pump inlets 22 and removed from the interior space, thereby avoiding pockets of stationary adhesive that cannot be removed from the storage device (e.g., the buffer unit 10). As described in further detail below, the buffer unit 10 includes additional features that optimize pump performance and reliability by providing a short and easy flow path for makeup air to reach the pumps 24, while also ensuring that any coalesced clumps of adhesive in the bulk supply are broken apart before delivery to the pump inlets 22 that could be clogged with such clumps. Accordingly, the buffer bin 12 of the exemplary embodiment enhances the reliability of supply to an adhesive melter by overcoming problems with pneumatic pump clogging, as well as inefficient pump operation caused by a lack of air available to be drawn through the pneumatic pump 24.

The buffer unit 10 may be used in some adhesive fill systems as an intermediate storage device located proximate the mounting location for one or more adhesive melters and adhesive dispensing devices. To this end, the buffer unit 10 is configured to hold sufficient adhesive particulate to supply the connected adhesive melters for a couple of hours of operation time or longer, which enables a period of time to refill the buffer unit 10 by operators of the adhesive dispensing devices. The buffer unit 10 may be refilled from larger bulk stock of adhesive particulate using mobile bins (described briefly below with reference to FIGS. 5A and 5B) or other methods, but regardless of how the refilling occurs, the buffer unit 10 is configured to provide a reliable supply of adhesive particulate to the one or more adhesive melters over a period of operation.

Figure 2:
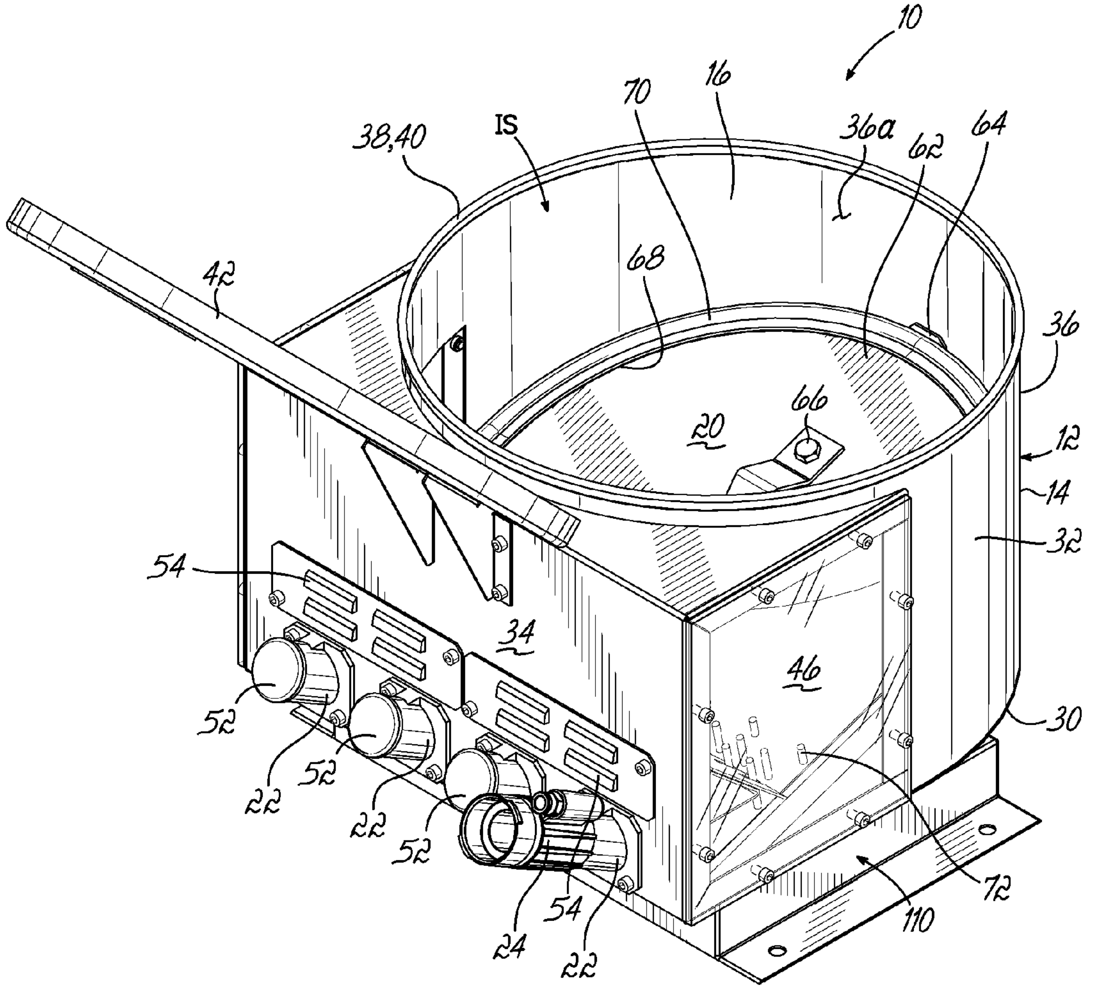
FIG. 2 is a rear perspective view of the buffer unit of FIG. 1, showing a pneumatic pump coupled to one of the pump inlets of the buffer bin.

Now with particular reference to FIGS. 1 and 2, several external features of the exemplary embodiment of the buffer unit 10 are shown. The buffer bin 12 includes the housing 14, which is defined by a generally horizontal bottom wall 30 and a sidewall 32 extending generally upwardly from the bottom wall 30 to collectively define the interior space IS. Although the bottom wall 30 is shown to be a solid member enclosing the housing 14 along the bottom thereof, it will be understood that the bottom wall 30 may be perforated or partially open in other embodiments. The sidewall 32 of this embodiment includes a generally planar front side 34 and a U-shaped or generally semi-cylindrical rear side 36, each extending upwardly from the bottom wall 30 to an inlet 38 defined at a top opening 40 of the housing 14. The housing 14 may also include a lid 42 that is pivotally (via a hinge 44) or removably mounted to the sidewall 32 so that the top opening 40 of the housing 14 may be opened and closed as needed during operation of an adhesive dispensing system incorporating the buffer bin 12. In the exemplary embodiment, the top opening 40 and the lid 42 are both formed with a circular shape, although other shapes for these elements may be used in other embodiments.

The rear side 36 of the housing 14 is generally solid, although the buffer bin 12 can include one or more viewing windows 46 at the rear side 36 that allow the level or amount of adhesive particulate in the buffer bin 12 to be viewed from outside the buffer bin 12, even when the lid 42 is closed. The viewing windows 46 also allow for an operator to confirm proper operation of the buffer bin 12 so that air starvation or clogging of the pneumatic transfer pumps 24 connected to the buffer bin 12 does not occur. It will be understood that the windows 46 may be omitted or repositioned in other embodiments of the invention.

The front side 34 of the housing includes a series of the pump inlets 22 that project through the housing 14 adjacent the junction of the bottom wall 30 with the front side 34. The pump inlets 22 define an outlet 50 from the interior space IS of the housing 14. In some embodiments such as the one shown in FIG. 2, the pump inlets 22 may include removable caps 52 that block communication with the interior space IS of the housing 14 when a pneumatic transfer pump 24 is not connected to those pump inlets 22. One conventional pneumatic venturi pump 24 is shown connected to one of the pump inlets 22 in FIGS. 2 and 3, for example. However, the buffer unit 10 may be configured to operate with up to four different pneumatic pumps 24 and adhesive melters in the exemplary embodiment. To this end, the buffer bin 12 is sized to reliably feed up to four adhesive melters connected to the buffer unit 10 for a period of multiple hours, in the exemplary embodiment. It will be appreciated that more or fewer pump inlets 22 may be provided in the front side 34 in other embodiments consistent with the scope of the invention.

Also shown in FIG. 2, the front side 34 also includes a series of air vents 54 located immediately above the series of pump inlets. The air vents 54 communicate with an air channel 56 described in further detail below. To this end, the air vents 54 provide air at a convenient location immediately adjacent to the pump inlets 22, thereby avoiding the need to draw makeup gas through the bulk supply of adhesive particulate stored in the buffer bin 12.

Figure 3:
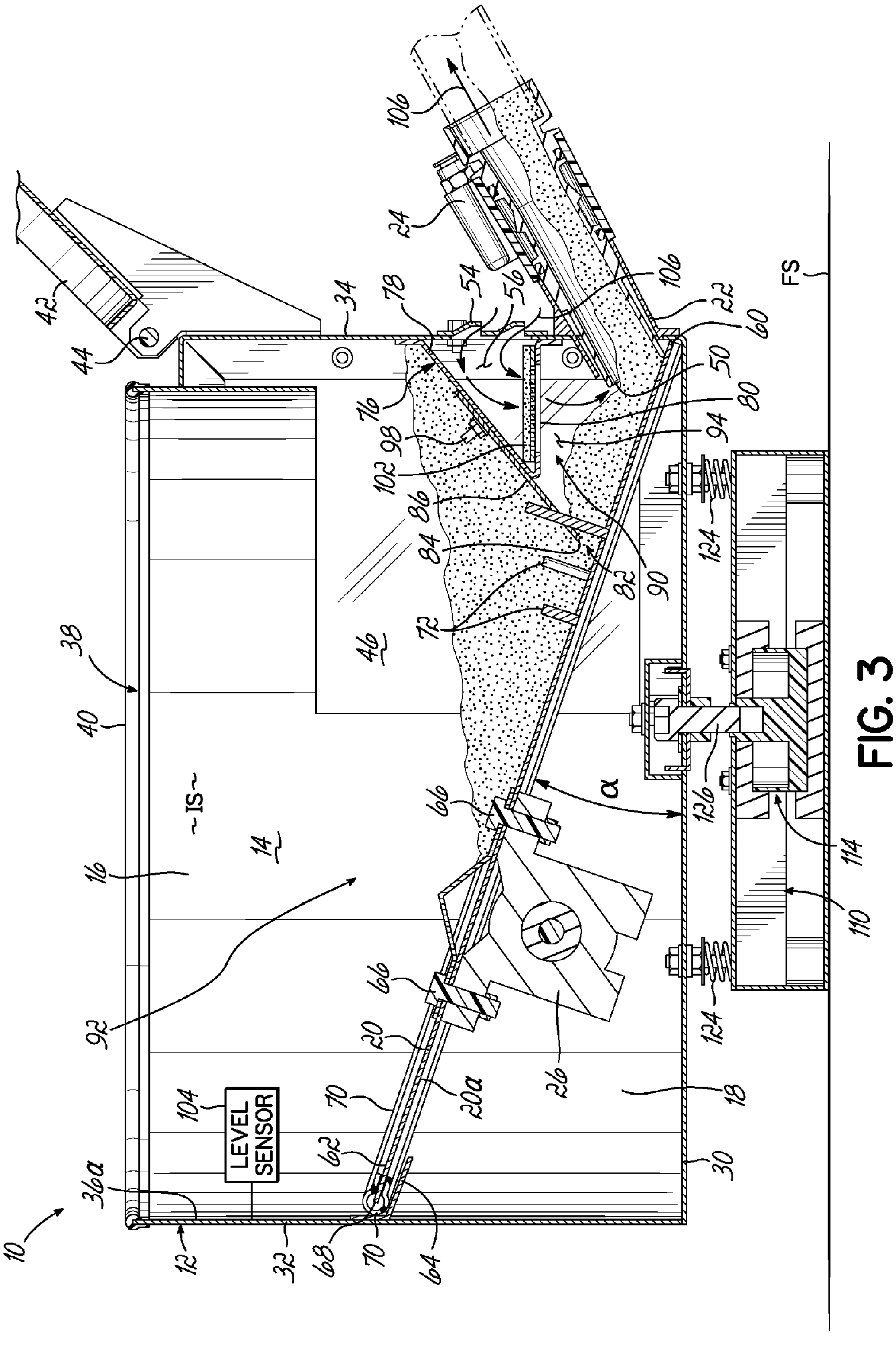
FIG. 3 is a cross-sectional side view of the buffer unit, taken along line 3-3 in FIG. 1, and schematically showing adhesive particulate and air flow through the interior space defined by the buffer bin.

The buffer unit 10 also includes the agitator plate 20, which is positioned into the housing 14 as briefly described above. The agitator plate 20 is visible in FIGS. 1 and 2, but this element and the other internal features within the buffer bin 12 are more clearly shown with reference to FIG. 3. The agitator plate 20 divides the interior space IS into the upper chamber portion 16 configured to receive adhesive particulate and the lower chamber portion 18 configured to be isolated from the adhesive particulate. The agitator plate 20 is sized such that a bottom end 60 of the agitator plate 20 is located adjacent to the pump inlets 22 and also abuts the junction between the bottom wall 30 and the front side 34 of the housing 14, while an upper end 62 of the agitator plate 20 is located approximately half the distance up the height of the rear side 36. To this end, the agitator plate 20 is supported in an angled orientation, e.g., a non-horizontal orientation, within the housing 14. As shown in FIG. 3, this angled orientation may be defined by a plate angle α measured from the horizontal orientation of the bottom wall 30. The agitator plate 20 therefore provides a sloped surface that defines a substantial portion of the bottom of the upper chamber portion 16. This sloped surface is what the adhesive particulate in the buffer bin 12 will slide along during movement of the adhesive particulate toward the pump inlets 22.

More particularly, the agitator plate 20 is supported at the upper end 62 thereof by sitting on a ledge provided by a support bracket 64 welded or otherwise coupled to an interior surface **36*a* of the rear side 36 of the housing 14. The support bracket 64 is provided in a fixed position in the exemplary embodiment shown, but it will be understood that the support bracket 64 may be adjustable in position. To this end, in some embodiments the support bracket 64 is removably coupled to the sidewall 32 such as by bolt fasteners so that the support bracket 64 can be moved upwardly or downwardly to change the plate angle α (however, it will also be understood that the size of the agitator plate 20 itself would likely need to be modified as well if the position change of the support bracket 64 was significant because the agitator plate 20 must still prevent adhesive particulate from flowing into the lower chamber portion 18). The support bracket 64 functions advantageously to prevent the agitator plate 20 from wedging into significant frictional engagement around its entire periphery 68 with the housing 14, as such wedging would cause more transmission of vibrations into the sidewall 32 (e.g., the ability of the agitator plate 20 to vibrate by itself would be significantly reduced) and significant difficulty in removing the agitator plate 20 when necessary, both of which are undesirable. As a result of the rigid support by the bottom wall 30 at the bottom end 60 and by the support bracket 64 at the upper end 62, the agitator plate 20 is maintained in position during loading of the buffer bin 12 with adhesive particulate and during use of the buffer bin 12**.

The buffer unit 10 also includes the vibration generating mechanism 26 mounted to the agitator plate 20 along a bottom side **20*a* thereof. To this end, the vibration generating mechanism 26 is coupled with the agitator plate 20 using fasteners 66 so as to project downwardly into the lower chamber portion 18, as most clearly shown in FIG. 3. The vibration generating mechanism 26 is configured to generate vibration energy and transmit it through the entire agitator plate 20. As a result, the agitator plate 20 transmits the vibration into the adhesive particulate sitting within the upper chamber portion 16 of the buffer bin 12. It will be understood that the vibration generating mechanism 26 may be replaced with other types of drives that agitate the agitator plate 20 or other types of similar separating elements/plates located proximate the bottom wall 30 of the buffer bin 12. As long as the vibration generating mechanism 26 or drive moves the agitator plate 20 or separating element relative to a bottom surface of the bulk supply of adhesive particulate, the adhesive particulate will be fluidized so as to flow towards the pump inlets 22**.

The agitator plate 20 also includes additional mounting features that enhance the transmission of vibration from the vibration generating mechanism 26 into the adhesive particulate. More specifically, the agitator plate 20 defines a periphery 68 and a resilient cushion 70 is positioned around the periphery 68. The resilient cushion 70 is formed from rubber in the exemplary embodiment, but other similar materials may be used for the similar functionality described below. This rubber cushion 70 serves multiple functions. First, the rubber cushion 70 effectively seals the joint formed between the agitator plate 20 and the remainder of the housing 14 so that the adhesive particulate cannot escape through to the lower chamber portion 18. Second, the rubber cushion 70 tends to discourage transmission of the vibration at the agitator plate 20 to the remainder of the housing 14 (e.g., sidewall 32), which forces the vibration to be transmitted primarily to the adhesive particulate instead. In this regard, the rubber cushion 70 is dampening the vibrations before transmissions to the sidewall 32. The agitator plate 20 may also include resilient mounting elements such as springs (not shown in FIG. 3) located at the points of support at the bottom wall 30 and at the support bracket 64 in order to further dissipate transmission of vibration into the housing 14 in other embodiments. Consequently, the agitator plate 20 ensures sufficient vibration is provided to assist with moving the adhesive particulate along the sloped surface defined by the agitator plate 20 and to assist with breaking apart any clumps of coalesced adhesive particulate, thereby forming the flow of fluidized adhesive particulate in the buffer bin 12.

Figure 4:
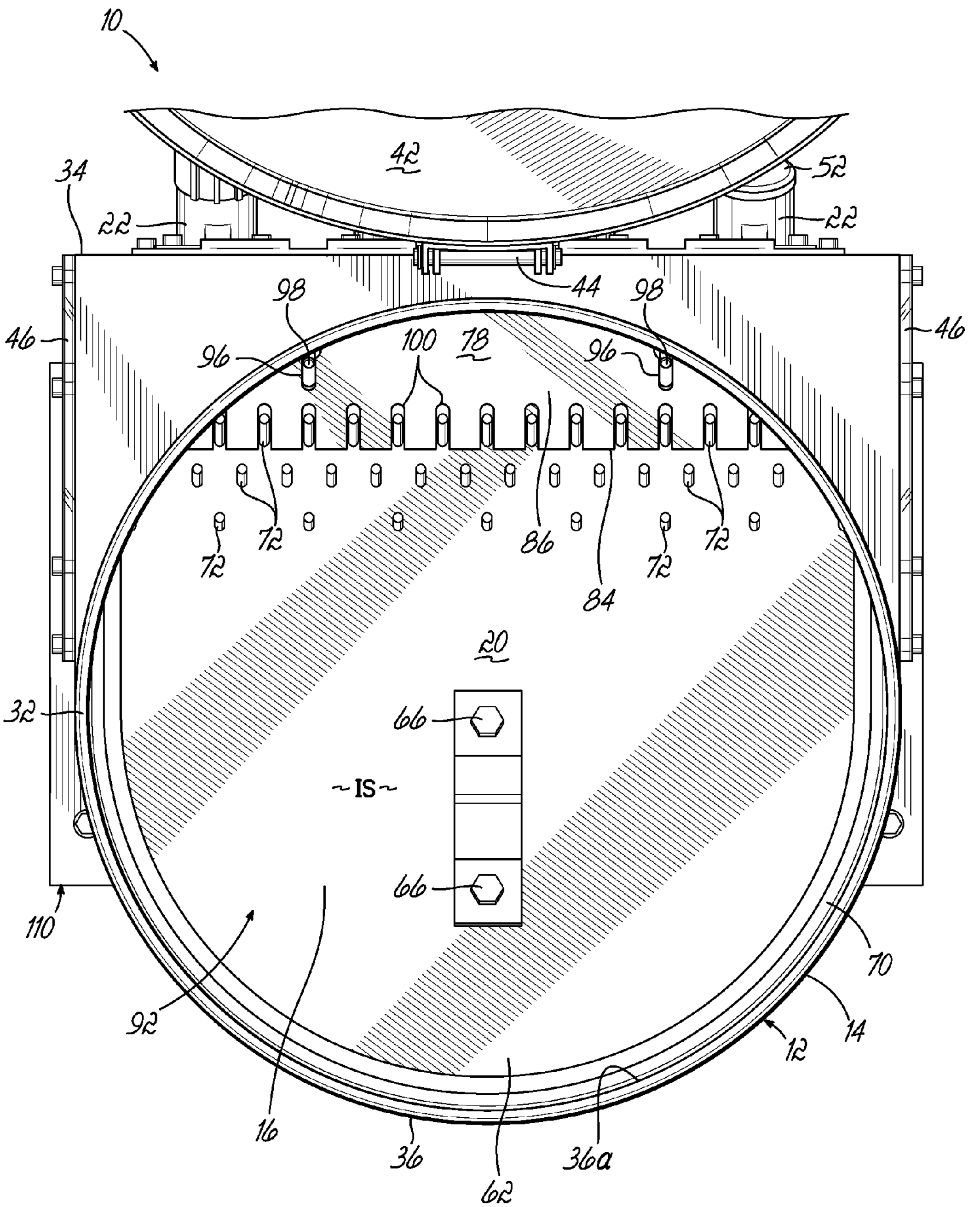
FIG. 4 is a top view of the buffer unit of FIG. 1, with the lid opened so as to look down into the interior space defined by the buffer bin.

The agitator plate 20 also includes a plurality of pins 72 extending upwardly from the sloped surface into the upper chamber portion 16. The plurality of pins 72 includes three rows of pins 72 that are aligned with one another in the rows as shown in FIG. 3. Furthermore, these pins 72 have varying lengths and may be offset from one another from row to row in order to ensure that the flow of particulate adhesive moving along the sloped surface is subdivided into a plurality of flows. For example, as shown in FIGS. 3 and 4, the row of pins 72 closest to the pump inlets 22 includes the longest length pins 72 in the three rows shown in the exemplary embodiment, and the shortest pins 72 are located in the row closest to the support bracket 64. The pins 72 of the first and third rows are laterally aligned with one another (although there may be more pins 72 in one of these rows as shown), while the pins 72 in the second or middle row are offset laterally from those in adjacent rows so as to encounter portions of the flow of adhesive particulate that may have passed between two of the pins 72 in the previous row. In this regard, the adhesive particulate at the bottom of the bulk supply will be forced to travel adjacent to at least one of the plurality of pins 72 during movement along the agitator plate 20 towards the pump inlets 22, and any clumps of adhesive that can pass through the gaps between the pins 72 will be small enough to be handled at the pump inlets 22.

The plurality of pins 72 also function to transmit vibration from the agitator plate 20 farther into the bulk supply of adhesive particulate to encourage clumps of coalesced adhesive particulate to break apart before moving to the pump inlets 22. As a result of the vibration being applied along a substantial portion of the bottom surface defined by the upper chamber portion 16 and the pins 72 breaking flow of the adhesive particulate apart, clumps of adhesive do not tend to pass into the pump inlets 22 and therefore clogging of the pump inlets 22 with clumps of coalesced adhesive particulate is minimized. It will be understood that the relative lengths of the pins and the arrangement of those pins in rows may be modified in other embodiments of the buffer bin 12 without departing from the scope of the invention.

With continued reference to FIG. 3 and as briefly described above, the upper chamber portion 16 also includes an air channel 56 that is positioned proximate the pump inlets 22 along the front side 34 of the housing 14 so that makeup gas can be provided reliably and easily to the pneumatic transfer pumps 24. The air channel 56 is defined by an air channel housing 76 connected to the front side 34 and projecting inwardly from the front side 34 of the housing 14. More particularly, the air channel housing 76 includes a flow control plate 78 extending inwardly from a connection to the front side 34 of the housing 14 at an angle from a horizontal orientation and a divider plate 80 extending generally horizontally between the free end of the flow control plate 78 and the front side 34 of the housing 14. Accordingly, the air channel 56 is defined to have a generally triangular shape because the air channel housing 76 is delimited by these three planar sides: the front side 34 of the housing 14, the flow control plate 78, and the divider plate 80. Each of the divider plate 80 and the flow control plate 78 is located spaced above the pump inlets 22 and each is also spaced above the agitator plate 20. The air channel 56 provides an open space for air flow through the air vents 54 proximate to the pump inlets 22 as previously described. The flow control plate 78 and the divider plate 80 are shown as an integral unit coupled to the sidewall 32 by welding or similar attachment mechanisms in the illustrated embodiment, but it will be understood that these elements may be provided separately without departing from the scope of the embodiments of this invention.

The flow control plate 78 is angled in an opposite or transverse orientation to the sloped surface defined by the agitator plate 20. As a result, the flow control plate 78 extends towards the agitator plate 20 and defines a gap 82 or opening between a leading end 84 of the flow control plate 78 and the agitator plate 20. The gap 82 is sized to control the communication of fluidized adhesive particulate moving towards the pump inlets 22. As described in further detail below, the flow control plate 78 also includes an adjustable gate portion 86 that is moveably coupled to the remainder of the flow control plate 78 and that defines the leading end 84 of the flow control plate 78. The adjustable gate portion 86 extends from the tip of the air channel housing 76 (e.g., at the junction of the divider plate 80 and the flow control plate 78) to modify or reduce the size of the gap 82 defined between the agitator plate 20 and the flow control plate 78. It will be understood that the gate portion 86 is configured such that the maximum size of the gap 82 still prevents any remaining non-fluidized clumps of adhesive particulate which are too large to fit in the pump inlets 22 from moving to the pump inlets 22

Consequently, the flow control plate 78 including the gate portion 86 effectively subdivide the upper chamber portion 16 of the buffer bin 12 into two additional portions: a pump inlet chamber 90 located adjacent to the pump inlets 22 and the bottom end 60 of the agitator plate 20, and a primary storage container 92 located above the flow control plate 78 and above the agitator plate 20, particularly at locations near the upper end 62 of the agitator plate 20. The primary storage container 92 is configured to hold the bulk supply of adhesive particulate within the buffer bin 12 and the flow control plate 78 and agitator plate 20 collectively define a funnel shape at the bottom of this primary storage container 92. The funnel shape leads to the gap 82 between the leading end 84 of the flow control plate 78 and the agitator plate 20, so the primary storage container funnels or leads the adhesive particulate towards the gap 82 for metered flow into the pump inlet chamber 90. The divider plate 80 extends across the pump inlet chamber 90 as shown in FIG. 3 to divide this pump inlet chamber 90 even further into the air channel 56 located above the divider plate 80 and an adhesive outlet portion 94 communicating between the gap 82 and the pump inlets 22. This split of the pump inlet chamber 90 into the air channel 56 and the adhesive outlet portion 94 is advantageous because it separates the makeup gas flow path from the adhesive particulate flow path, as set forth in further detail below. The arrangement of different subsections or chambers/containers within the upper chamber portion 16 enables the buffer bin 12 to meter the flow of fluidized adhesive particulate to the pump inlets 22 while also providing some separation between the bulk supply in the primary storage container 92 and the pump inlets 22 at the pump inlet chamber 90.

The gate portion 86 is coupled to the remainder of the flow control plate 78 in such a manner so as to be adjustable in position by an operator of the buffer unit 10. To this end, the gate portion 86 of the exemplary embodiment includes linear slots 96 each configured to receive a fastener 98 that extends through the gate portion 86 and through the flow control plate 78. When the fastener 98 is loosened (such as by manual adjustment), the gate portion 86 is free to slide upwardly and downwardly along the remainder of the flow control plate 78 (e.g., the fasteners 98 can move in the linear slots 96). This movement of the gate portion 86 modifies the thickness of the gap 82 between the leading end 84 defined by the gate portion 86 and the agitator plate 20. Accordingly, the specific size of gap 82 provided between the primary storage container 92 and the pump inlet chamber 90 may be adjusted depending on the particular application by moving the gate portion 86 and re-tightening the associated fasteners 98. Of course, it will be appreciated that the gate portion 86 may be automatically adjustable in position in other similar embodiments rather than manually adjusted in position.

In operation, round pellet shaped adhesive particulate and smaller sizes of adhesive particulate tend to roll and slide more readily down the agitator plate 20, so the gap 82 may be made smaller to prevent this more free-flowing adhesive particulate from completely filling/flooding the pump inlet chamber 90. Likewise, when chicklet-shaped or irregular-shaped adhesive particulate or larger sized adhesive particulate is used in the buffer bin 12, the gate portion 86 may be moved upwardly to form a larger gap 82 to ensure sufficient flow of the less free-flowing adhesive particulate enters the pump inlet chamber 90. Operators may test and adjust the size of the gap 82 for different types of adhesive particulate, in order to find the preferable balance between flow into the pump inlet chamber 90 and maintaining an air pocket above the particulate adhesive in the pump inlet chamber 90 (e.g., not completely flooding the pump inlets 22). The gap 82 is therefore adjustable to reliably meter many different types of solid adhesive particulate that may be used with the buffer unit 10 and the associated adhesive fill system.

As shown most clearly in FIGS. 1 and 4, the gate portion 86 may further include a plurality of slots 100 along the leading end 84 thereof in order to receive one or more rows of the pins 72 that project upwardly from the agitator plate 20. To this end, the gate portion 86 may effectively engage with one or more of the rows of pins 72 to further ensure division of the flow of adhesive particulate as it flows through the gap 82 and before delivery into the pump inlets 22. This division of the flow and the vibration applied to the adhesive particulate along the entire agitator plate 20 (and via the pins 72 as well) encourages any coalesced clumps of adhesive material to break apart before entry into the pump inlet chamber 90. Accordingly, the gap 82 effectively meters the flow of adhesive particulate into the pump inlet chamber 90, and the agitator plate 20 and pins 72 ensure all clumps of adhesive particulate are broken apart before those clumps could become a clog or blockage at the pump inlets 22, as shown in FIG. 3.

The divider plate 80 of the air channel housing 76 is configured to include a plurality of filter screens 102 that enable flow of air through the air vents 54 and the air channel 56 to pass into the air pocket formed at the top of the pump inlet chamber 90. The filter screens 102 also prevent contamination such as dust from entering the interior space IS and affecting the adhesive particulate being delivered by the pneumatic pumps 24 connected to the pump inlets 22. In addition, the filter screens 102 also provide a positive block to adhesive particulate that may partially fill the pump inlet chamber 90 at times. The adhesive particulate in the pump inlet chamber 90 therefore cannot move into the air channel 56, which avoids any blockage of the air space in the air channel 56 located proximate to the pump inlets 22. Accordingly, even if an air pocket within the pump inlet chamber 90 (which is desirable to maintain, if possible) fills with adhesive particulate in a temporary flooding of this compartment, the pump inlets 22 will still be able to form vacuum by drawing makeup gas from the air channel 56 without requiring this makeup gas to be drawn through the entire bulk supply located in the primary storage container 92. However, these circumstances should be noted through the windows 46 of the sidewall 32 if they occur frequently, and the size of the gap 82 adjusted with the gate portion 86 to further meter or limit flow of adhesive particulate and allow for the desirable air pocket to be even closer to the pump inlets 22 during normal operation. Regardless, the air channel 56 and the divider plate 80 with filter screens 102 ensures reliable operation of the pneumatic pumps 24 because the path for makeup gas is short and not subject to significant constriction.

As schematically shown in FIG. 3, the buffer unit 10 may also include a level sensor 104 operatively coupled to the buffer bin 12. The level sensor 104 is a known sensing device that is configured to sense whether the adhesive particulate within the upper chamber portion 16 (specifically within the primary storage container 92) falls below a threshold level which indicates a refill of the adhesive particulate by an operator is needed soon or immediately to ensure continuous operation of the pumps 24 and the melters connected to the pumps 24. Especially in embodiments where a mobile bin is docked to the buffer unit 10 and left to continuously supply adhesive particulate into the upper chamber portion 16 for multiple hours of operation, this level sensor 104 can avoid the need to continuously monitor levels of adhesive through the viewing windows 46. Other similar known structures and control devices may be used with the buffer unit 10 without departing from the scope of the disclosed embodiments.

During operation of the adhesive melters (not shown) fed by the pneumatic pumps 24 at the pump inlets 22, the buffer unit 10 provides several advantages compared to the conventional tote-based systems. The vibration applied along an entire sloped surface of the agitator plate 20 ensures that the adhesive particulate about to move into the pump inlet chamber 90 is vibrated and forced through and around the plurality of pins 72 to break up any clumps of coalesced adhesive particulate. Furthermore, the vibration helps efficiently move a desired amount of adhesive particulate to the pump inlets 22 on demand from the pneumatic pumps 24. The adjustment of the gap 82 between the primary storage container 92 and the pump inlet chamber 90 enables a metered amount of flow into the pump inlet chamber 90 regardless of the size and shape of adhesive particulate being used at the buffer bin 12. Furthermore, makeup gas or air for operation of the pumps 24 is provided in the air channel 56 as well as in an air pocket formed above the adhesive particulate within the pump inlet chamber 90, each of these being proximate to the pump inlets 22. This air is therefore readily drawn into the pump inlets 22 by the pneumatic pumps 24 during operation, thereby ensuring an efficient and reliable operation of the pneumatic pumps 24. The air flow is shown by arrows 106 in FIG. 3. Consequently, problems with clogging of pump inlets 22 and air starvation of pneumatic pumps 24 is removed in this buffer bin 12. Additionally, the positioning of the pump inlets 22 and the bottom end 60 of the agitator plate 20 at the bottom wall 30 of the housing 14 ensures that substantially all of the adhesive particulate delivered into the buffer unit 10 can be removed from the buffer bin 12 by the pumps 24. To this end, there is no dead zone of adhesive pockets below the pump inlets 22 in this design, which avoids the eventual solidification and potential blockage of the pump inlets 22 sometimes caused in conventional tote designs.

Figure 5A:
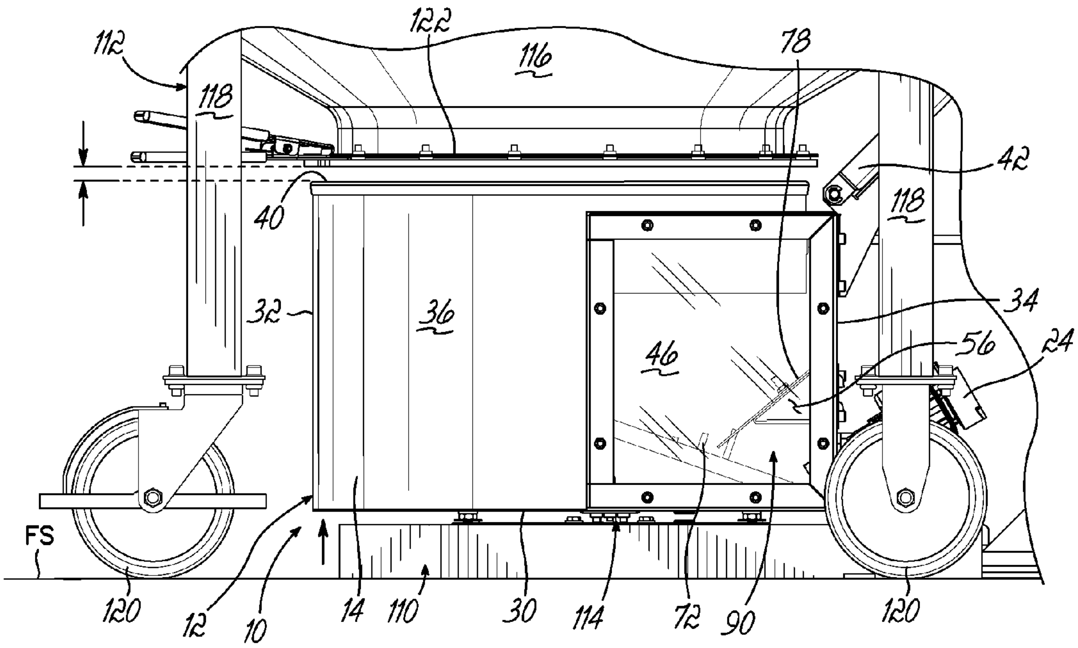
FIG. 5A is a side elevation view of the buffer unit of FIG. 1, with a mobile bin configured to refill the buffer bin being positioned over the opening in the buffer bin.
Figure 5B:
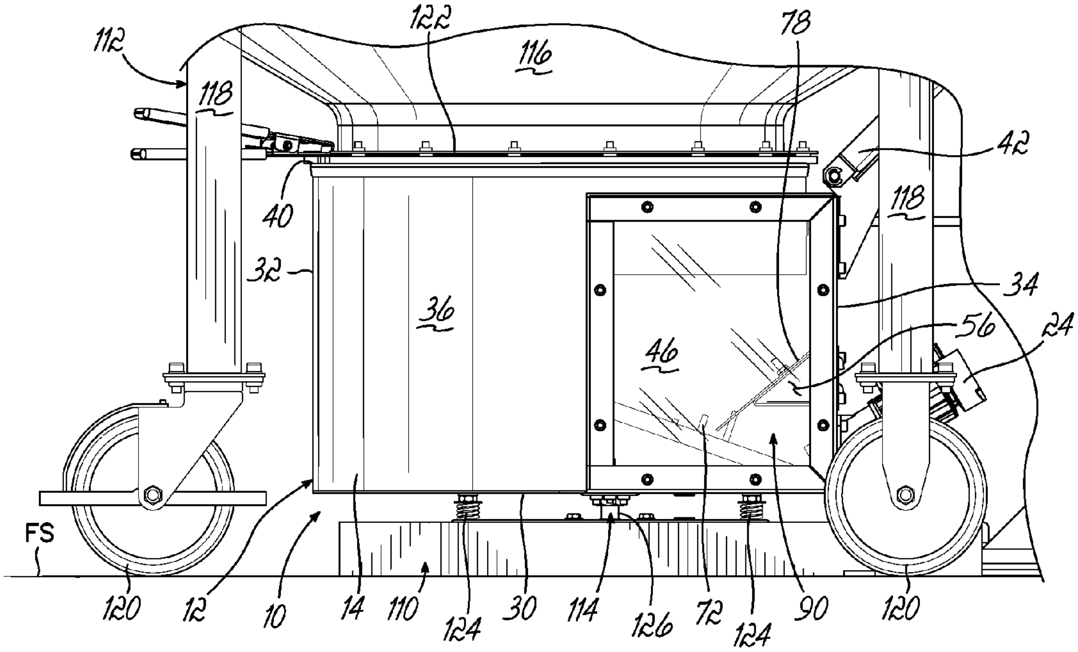
FIG. 5B is a side elevation view of the buffer unit and mobile bin of FIG. 5A, with the buffer bin elevated into physical connection (e.g., docked) with the mobile bin.

The buffer unit 10 may include additional elements for advantageous use with other components of an adhesive fill system. For example, the buffer unit 10 includes a platform 110 for selectively lifting the buffer bin 12 as shown in FIGS. 5A and 5B. The platform 110 is connected to the bottom wall 30 by pneumatic or other actuators (e.g., a lift mechanism 114) that are operable to elevate the buffer bin 12 into engagement with a mobile bin 112 configured to deliver the adhesive particulate into the buffer bin 12 through the top opening 40. Such movement of the buffer bin 12 between upper and lower positions is shown, for example, in FIGS. 5A and 5B. The platform 110 also supports the buffer bin 12 on a floor surface FS so that the mobile bin 112 can be rolled into position over the buffer unit 10. It will be understood that the platform 110 may alternatively be mounted on a raised framework in other embodiments, depending on the height of the mobile bin 112 to be used with the buffer unit 10.

As shown in FIGS. 5A and 5B, the mobile bin 112 carries a large bulk supply of adhesive and may be moved over the buffer bin 12. The mobile bin 112 may be configured to receive a large amount of adhesive particulate from a bulk supply located a distance away from the adhesive melters and buffer unit 10. The mobile bin 112 includes a container 116 mounted on a support framework of legs 118, each leg including a wheel 120 as shown. Thus, the mobile bin 112 is moved to a position above the buffer bin 12 by rolling the wheels 120 along the rails of the platform 110 to align the mobile bin 112 with the buffer bin 12 and then transfer the adhesive particulate in the mobile bin 112 to the buffer bin 12. The container 116 on the mobile bin 112 includes a manually-actuated valve 122 that is operated to direct adhesive particulate from the container 116 of the mobile bin 112 into the buffer bin 12 through the top opening 40. Optionally, the buffer bin 12 may be mated with the container 116 before the valve 122 is operated, using the lift mechanism 114, to direct adhesive, such as by moving the buffer bin 12 upwardly into contacting engagement with the container 116.

In the exemplary embodiment shown, the lift mechanism 114 includes at least one compression spring 124 biasing the buffer bin 12 upwardly away from the platform 110 towards a raised position (FIG. 5B) and an air cylinder 126 that may be actuated to push the buffer bin 12 into the lowered position (FIG. 5A) against the bias of the at least one compression spring 124. The compression springs 124 and the air cylinder 126 each extend in the exemplary embodiment between the bottom wall 30 of the buffer bin 12 and the platform 110. Alternatively, the mobile bin 112 could include a mechanism for moving the container 116 downwardly into contacting engagement with the buffer bin 12 in other embodiments. Regardless of whether the buffer bin 12 or the mobile bin 112 includes the movement mechanism, the buffer bin 12 is configured to be spaced apart from the container 116 when the mobile bin 112 is moving into or out of position relative to the buffer bin 12, and then configured to be engaged with the container 116 once these elements are aligned and properly positioned. The mobile bin 112 may be left at the buffer unit 10 with the valve 122 opened to continuously feed adhesive into the primary storage container 92 during operation of the buffer unit 10, or the mobile bin 112 may be used to refill the buffer bin 12 and then moved away for other uses (in such circumstances, the lid 42 is typically closed once the mobile bin 112 is moved away).

More particularly, the buffer bin 12 may be used in continuous operation while the mobile bin 112 is placed in contact with the buffer bin 12 in some embodiments. In this regard, the buffer bin 12 may be continuously replenished with adhesive particulate from the mobile bin 112 during operation. In such embodiments, the level sensor 104 may be located near the top opening 40 for detecting when the mobile bin 112 has run out of adhesive particulate and is no longer replenishing the supply in the buffer bin 12. When this occurs, the buffer bin 12 is configured to supply adhesive particulate to multiple adhesive melters for at least a couple of hours (e.g., the buffer bin 12 contains at least 15-20 kilograms of adhesive particulate, in one example) before running out. This time period allows the operator to remove the mobile bin 112 and refill it for replacement at the buffer bin 12 at the earliest convenience.

Alternatively, the buffer bin 12 may be filled by the mobile bin 112 and then the mobile bin 112 removed for filling other buffer bins 12. In such embodiments, the lid 42 of the buffer unit 10 is closed during operation and the level sensor 104 is typically moved to a lower location within the upper chamber portion 16, as alluded to above. The level sensor 104 would still provide warning with enough lead time to enable a refilling of the upper chamber portion 16 with adhesive particulate, but the time window would be shortened from the previously described operation. Regardless of the particular operation, the buffer unit 10 provides intermediate bulk storage and metering of adhesive particulate to pneumatic pumps 24 and to adhesive melters as needed during operation of a hot melt adhesive dispensing system. Furthermore, the buffer unit 10 improves the operation and efficiency of storage and fill systems used with a hot melt dispensing system.

While the present invention has been illustrated by the description of specific embodiments thereof, and while the embodiments have been described in considerable detail, it is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope or spirit of the general inventive concept.

What is claimed is:

1. A buffer unit configured to store and transfer adhesive particulate to an adhesive melter, the buffer unit comprising:

a buffer bin defined by a housing including a bottom wall and a sidewall extending from said bottom wall to form an interior space;

an agitator plate positioned within said buffer bin so as to be angled from a horizontal orientation, said agitator plate including an upper end operatively coupled to said sidewall and a bottom end operatively coupled to said bottom wall, said agitator plate dividing said interior space into a lower chamber portion and an upper chamber portion configured to receive a bulk supply of adhesive particulate;

a vibration generating mechanism operatively coupled to said agitator plate and configured to selectively vibrate said agitator plate to produce a relative motion between said agitator plate and the bulk supply of adhesive particulate, the relative motion configured to agitate the bulk supply to generate a flow of fluidized adhesive particulate which moves towards said bottom end of said agitator plate;

a pump inlet chamber located in said buffer bin proximate to said bottom end of said agitator plate, said pump inlet chamber configured to receive the flow of fluidized adhesive particulate moving towards said bottom end to be transferred to the adhesive melter; and a flow control element defining a gap for communication of adhesive particulate from said upper chamber portion to said pump inlet chamber, said gap controlling the flow of adhesive particulate to avoid flooding said pump inlet chamber.

2. The buffer unit of claim 1, said buffer bin including a top opening configured to provide an inlet for the adhesive particulate to be delivered into said interior space, and said buffer bin further including a lid pivotally coupled to said housing and configured to selectively open and close access to said interior space through said top opening.

3. The buffer unit of claim 1, further comprising:

a platform operatively coupled to said bottom wall of said buffer bin, said platform supporting said buffer bin on a floor surface; and a lift mechanism connecting said platform to said bottom wall, said lift mechanism operating to move said buffer bin upwardly relative to said platform to selectively engage a mobile bin configured to refill said upper chamber portion with the adhesive particulate.

4. The buffer unit of claim 3, said lift mechanism further comprising:

at least one compression spring extending between said bottom wall of said buffer bin and said platform, said at least one compression spring biasing said buffer bin to move upwardly away from said platform; and an air cylinder connected to said bottom wall of said buffer bin and said platform, said air cylinder being actuated to move said buffer bin downwardly toward said platform against the bias of said at least one compression spring.

5. The buffer unit of claim 1, said vibration generating mechanism being located within said lower chamber portion such that said vibration generating mechanism is isolated from the adhesive particulate.

6. The buffer unit of claim 1, said sidewall of said buffer bin including a front side defining an outlet for the adhesive particulate at said pump inlet chamber, said sidewall including a rear side opposite said front side, and said buffer bin further comprises a support bracket coupled with said rear side of said sidewall at a position above said bottom wall, said support bracket engaging said upper end of said agitator plate to support said agitator plate at an angle from a horizontal orientation, the angle configured to promote flow of fluidized adhesive particulate toward said outlet.

7. The buffer unit of claim 6, said agitator plate defining a periphery with a resilient cushion surrounding said periphery, said resilient cushion configured to prevent leakage of adhesive particulate into said lower chamber portion and also dampening transmission of vibrations from said vibration generating mechanism to said sidewall and said bottom wall.

8. The buffer unit of claim 1, wherein said flow control element comprises a flow control plate, said flow control plate coupled to said sidewall and including a leading end spaced apart from said agitator plate by said gap.

9. The buffer unit of claim 8, said flow control plate being angled transversely to said agitator plate to collectively define a funnel shape leading toward said gap.

10. The buffer unit of claim 8, said flow control plate including an adjustable gate portion defining said leading end, said adjustable gate portion moveably mounted to a remainder of said flow control plate to adjust a size of said gap.

11. The buffer unit of claim 8, said agitator plate including a plurality of pins projecting upwardly into said upper chamber portion proximate said flow control plate, said plurality of pins transferring vibrations from said vibration generating mechanism into the bulk supply of adhesive particulate to encourage breaking up of any coalesced clumps of the adhesive particulate in the bulk supply before such clumps could flow through said gap into said pump inlet chamber.

12. The buffer unit of claim 11, said plurality of pins including multiple rows of pins, with said pins increasing in length in said rows closer to said gap, said pins in each said row of pins being positioned laterally offset from said pins in adjacent rows of pins such that the fluidized adhesive particulate flows adjacent to at least one of said plurality of pins to break up clumps before passing through said gap and into said pump inlet chamber.

13. The buffer unit of claim 8, further comprising:

at least one pneumatic transfer pump coupled to said pump inlet chamber, said at least one pneumatic transfer pump configured to remove the adhesive particulate from said pump inlet chamber and deliver the adhesive particulate to the adhesive melter.

14. The buffer unit of claim 13, wherein said sidewall of said buffer bin comprises air vents located between said flow control plate and said at least one pneumatic transfer pump, said air vents providing makeup gas to said at least one pneumatic transfer pump without requiring the makeup gas to travel through the bulk supply of adhesive particulate in said upper chamber portion.

15. The buffer unit of claim 14, further comprising:

a divider plate located within said pump inlet chamber and extending between said flow control plate and said sidewall to divide said pump inlet chamber into an air channel communicating with said air vents and an adhesive outlet portion communicating with said gap and said pump inlet chamber.

16. The buffer unit of claim 15, further comprising:

a filter covering a flow path through said divider plate between said air channel and said adhesive outlet portion, said filter configured to prevent adhesive particulate from entering and blocking said air channel and said filter configured to prevent contamination of adhesive with air drawn through said air channel and said air vents by said at least one pneumatic transfer pump.

17. A method of transferring adhesive particulate to an adhesive melter with a buffer unit including a buffer bin defining an interior space, an agitator plate positioned within the buffer bin at a non-horizontal orientation, a vibration generating mechanism coupled to the agitator plate, a pump inlet chamber including at least one pump inlet and communicating with the interior space, the pump inlet chamber configured to receive a flow of fluidized adhesive particulate and coupled with at least one pneumatic transfer pump, and a flow control element defining a gap for communication of adhesive particulate from the interior space to the pump inlet chamber, the method comprising:

storing a bulk supply of adhesive particulate within the interior space of the buffer bin such that the agitator plate engages a lower surface of the bulk supply;

generating vibrations at the agitator plate with the vibration generating mechanism to agitate the lower surface of the bulk supply and produce a flow of fluidized adhesive particulate;

guiding the flow of adhesive particulate along the non-horizontal orientation of the agitator plate to the at least one pump inlet;

forcing the flow of adhesive particulate through the gap to control an amount of the flow of adhesive particulate that is delivered at once to the pump inlet chamber and the at least one pump inlet; and removing adhesive particulate from the buffer bin through the at least one pump inlet with the at least one pneumatic transfer pump, for delivery to the adhesive melter.

18. The method of claim 17, wherein the buffer bin includes a lid and a top opening defining an inlet for adhesive particulate when the lid is open, and the method further comprises:

opening the lid to provide access into the interior space of the buffer bin via the top opening; and refilling the interior space with adhesive particulate when the buffer bin runs low on the bulk supply of adhesive particulate.

19. The method of claim 18, wherein refilling the interior space further comprises:

engaging the buffer bin with a mobile bin containing an additional supply of adhesive particulate; and transferring adhesive particulate from the mobile bin through the top opening into the buffer bin.

20. The method of claim 19, wherein the buffer unit further includes a platform and a lift mechanism operatively coupling the platform and the buffer bin, and engaging the buffer bin with the mobile bin further comprises:

actuating the lift mechanism to push the buffer bin upwardly away from the platform and into contact with the mobile bin.

21. The method of claim 17, wherein the buffer bin includes a bottom wall and the agitator plate includes a bottom end positioned adjacent the bottom wall and the at least one pump inlet, and removing adhesive particulate further comprises:

operating the pneumatic transfer pump and the vibration generating mechanism until all of the adhesive particulate held within the buffer bin flows to the at least one pump inlet and is removed by the pneumatic transfer pump for delivery to the adhesive melter.

22. The method of claim 17, further comprising:

adjusting a position of the flow control element to modify a size of the gap and thus control the flow of adhesive particulate into the pump inlet chamber.

23. The method of claim 17, wherein the buffer bin includes air vents located between the flow control element and the at least one pump inlet, and the method further comprises:

drawing makeup gas through the air vents to replace air removed by operation of the at least one pneumatic transfer pump, the makeup gas not being forced to travel through the bulk supply of adhesive particulate.

24. The method of claim 23, further comprising:

filtering the makeup gas drawn through the air vents with a filter before the makeup gas is delivered to the at least one pump inlet; and blocking the adhesive particulate from flowing to the air vents with the filter to avoid blockages of the air vents with the adhesive particulate.

25. The method of claim 17, wherein the agitator plate includes a plurality of pins projecting upwardly into the bulk supply of adhesive particulate, and the method further comprises:

transmitting vibrations from the vibration generating mechanism and the agitator plate into the bulk supply of adhesive particulate using the plurality of pins, thereby breaking up any clumps of coalesced adhesive particulate before the clumps can pass through the gap and into the pump inlet chamber.

26. A fill system configured to store and transfer adhesive particulate to an adhesive melter, the fill system comprising:

a storage container configured to contain a bulk supply of adhesive particulate;

a separating element positioned proximate a bottom end of said storage container, said separating element configured to engage a surface of the bulk supply and configured to move relative to the surface to separate adhesive particulate from the bulk supply and generate a flow of fluidized adhesive particulate, at least a portion of which moves out of said storage container for transfer to the adhesive melter;

a drive coupled to at least one of said storage container or said separating element, said drive operable to create the relative motion between said separating element and the surface of the bulk supply;

a pump inlet chamber communicating with said storage container and configured to receive the flow of fluidized adhesive particulate that has been generated by said separating element;

at least one pump communicating with said pump inlet chamber and configured to remove the flow of fluidized adhesive particulate from said pump inlet chamber and deliver the flow of fluidized adhesive particulate to the adhesive melter; and a flow control element defining a gap for communication of adhesive particulate from said storage container to said pump inlet chamber, said gap controlling the flow of adhesive particulate to avoid flooding said pump inlet chamber.

27. The fill system of claim 26, wherein a flow path is provided at the fill system for makeup gas drawn into said pump inlet chamber by said at least one pump, the flow path not requiring air flow through the bulk supply of adhesive particulate.

28. The fill system of claim 26, wherein:

said storage container includes a sidewall;

said separating element is defined by an agitator plate positioned to form at least a portion of said bottom end of said storage container; and said drive is defined by a vibration generating mechanism operatively coupled to said agitator plate and configured to selectively vibrate said agitator plate to generate the relative motion between said agitator plate and the surface of the bulk supply.

29. The fill system of claim 28, wherein said agitator plate is insulated from direct contact with said sidewall such that vibrations from said vibration generating mechanism are transferred primarily to the bulk supply of adhesive particulate.

30. The fill system of claim 28, wherein:

the fill system comprises a buffer bin including said agitator plate, said vibration generating mechanism, and a housing including a bottom wall and said sidewall of said storage container so as to form an interior space including said storage container;

said agitator plate is positioned within said housing so as to be angled from a horizontal orientation, said agitator plate including an upper end operatively coupled to said sidewall and a bottom end operatively coupled to said bottom wall, said agitator plate dividing said interior space into a lower chamber portion and an upper chamber portion, with said storage container located in said upper chamber portion;

the flow of fluidized adhesive particulate generated by selective vibration of said agitator plate moves towards said bottom end of said agitator plate during the selective vibration; and said buffer bin further comprises at least one pump inlet located in said housing proximate to said bottom end of said agitator plate, each pump inlet configured to receive the flow of fluidized adhesive particulate moving towards said bottom end to be transferred to the adhesive melter.

31. A method of storing and moving adhesive particulate to an adhesive melter using a transfer pump with a pump inlet communicating with a pump inlet chamber operatively coupled with a storage container, the method comprising:

receiving a bulk supply of the adhesive particulate in the storage container;

generating a flow of fluidized adhesive particulate at the bulk supply of the adhesive particulate such that the flow of fluidized adhesive particulate moves into the pump inlet chamber;

controlling the flow of fluidized adhesive particulate moving into the pump inlet chamber to prevent flooding of the pump inlet chamber with the adhesive particulate, thereby maintaining an open space within the pump inlet chamber proximate the pump inlet, the open space configured to contain gas to be drawn by the transfer pump; and actuating the transfer pump to generate a vacuum at the pump inlet to cause removal of the adhesive particulate from the pump inlet chamber for delivery to the adhesive melter.

32. The method of claim 31, wherein controlling the flow of fluidized adhesive particulate moving into the pump inlet chamber further comprises:

forcing the flow of fluidized adhesive particulate to move through a gap limiting communication between the pump inlet chamber and the storage container, the gap preventing a flow that would flood the pump inlet chamber with adhesive particulate.

33. The method of claim 32, wherein controlling the flow of fluidized adhesive particulate moving into the pump inlet chamber further comprises:

adjusting a metering of the flow of fluidized adhesive particulate into the pump inlet chamber by at least one of adjusting a size of the gap and selectively agitating the bulk supply of the adhesive particulate to generate the flow of fluidized adhesive particulate.

34. The method of claim 31, wherein the pump inlet chamber includes an air channel proximate the pump inlet defining at least a portion of the open space, and controlling the flow of fluidized adhesive particulate moving into the pump inlet chamber further comprises:

blocking flow of the adhesive particulate into the air channel to avoid forcing the transfer pump during actuation to draw make-up gas through the bulk supply of the adhesive particulate.

35. The method of claim 31, wherein generating the flow of fluidized adhesive particulate further comprises:

agitating the bulk supply of the adhesive particulate at the storage container to break apart clumps of stuck together adhesive particulate and thereby fluidize the adhesive particulate before flow into the pump inlet chamber.

* * * * *